July 24, 1962 W. R. JOHNSON 3,046,463

SPEED REGULATING APPARATUS FOR RECORDING MEDIA

Original Filed Oct. 30, 1956 2 Sheets-Sheet 1

INVENTOR.
WAYNE R. JOHNSON
BY
Lippincott & Smith
ATTORNEYS

July 24, 1962 W. R. JOHNSON 3,046,463

SPEED REGULATING APPARATUS FOR RECORDING MEDIA

Original Filed Oct. 30, 1956 2 Sheets-Sheet 2

INVENTOR.
WAYNE R. JOHNSON
BY Lippincott & Smith
ATTORNEYS 3,046,463

SPEED REGULATING APPARATUS FOR RECORDING MEDIA

Wayne R. Johnson, Los Angeles, Calif., assignor to Minnesota Mining and Manufacturing Company, St. Paul, Minn., a corporation of Delaware Continuation of application Ser. No. 619,143, Oct. 30, 1956. This application Jan. 5, 1959, Ser. No. 785,306
18 Claims. (Cl. 318—302)

Figure 1:
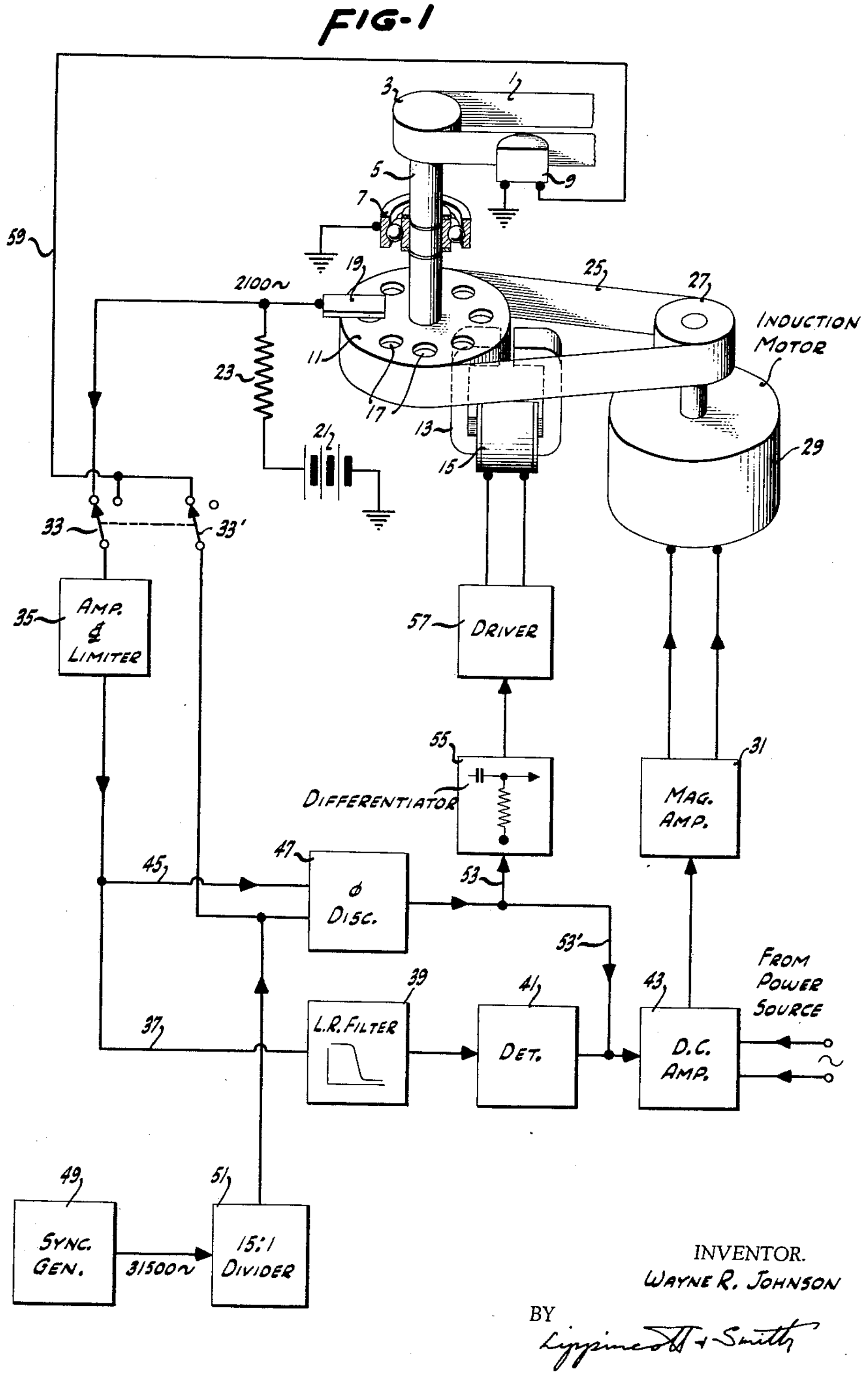

This is a continuation of co-pending application Serial No. 619,143, filed October 30, 1956, by Wayne R. Johnson for Speed Regulating Apparatus for Recording Media, now abandoned.

This invention relates to drive mechanisms for recording media. It is particularly applicable to apparatus for transporting magnetic recording tape as used in the recording and reproduction of television signals and will be described herein in connection with that use. This description, however, is not intended by way of limitation, since, with minor modifications that will be readily understood by those familiar with the recording art, the invention may be applied to other recording media such as discs, magnetic wire, or photographic film.

One of the major problems encountered in the recording and reproduction of wide-band signals such as are encountered in television, is that of phase modulation in the reproduced signals resulting from short-period variations in the speed of the drive. It is relatively easy to maintain the average speed of the medium constant; synchronous motors can be used for the purpose and can be supplied with ample power to drive the media under all conditions of load to which they are subjected, without pulling them out of step. The frequency of the power used to drive such motors may be crystal controlled to within a long term accuracy of one part in a million or better and with negligible short-period variations. Other types of motors are known whose average speed can be controlled to substantially the same degree of accuracy, and one such type will be specifically described herein. Motors of this character can be used to actuate a turntable, where disc recording is employed or a drive capstan for wire, tape, or strip-film. If the mechanical parts of the apparatus are precision-made to be accurately concentric with the drive shaft, and other due precautions taken, the speed of progression of the medium will be accurately proportional to the angular velocity of the motor shaft, any slippage that does occur being so slight as to be undetectable, even with high precision measuring equipment.

In spite of the constancy of average speed that can be thus obtained, variations in instantaneous speed can and do occur from various causes. Considering, for example, the case of television recordings on magnetic tape, the transducer heads now available will record and reproduce somewhere in the neighborhood of ten thousand cycles per inch of tape. In one piece of equipment used for television recordings a drive capstan of about one inch in diameter is used, progressing the tape 3.14+ inches per capstan revolution. Tape speeds have been employed for this purpose of between 100 and 300 inches per second, depending upon the method of recording used. Such speeds involve the use of long lengths of tape which are supplied by and fed to large reels, which, particularly when loaded with tape and traveling at the speeds mentioned have a very considerable inertia. In any practical operation it is not feasible to wind such lengths of tape absolutely concentrically upon the reels, and in paying out or taking up the tape there are consequently constant short term variations in the pull upon the tape and therefore the load upon the drive motor.

When a load is imposed upon any motor there is a lag produced between the relative phases, in space, of the rotating fields of the rotor and stator and the torque delivered by the motor is a direct function of the angle of lag. Changes of load on the motor, such as are applied by eccentricity of the tape reels, therefore result in corresponding changes in the angle of lag; i.e., in relatively short term changes in angular velocity of the motor shaft. Such changes, where they occur in recording or reproduction, result in phase modulation of the reproduced signals. Any change of one degree in angle of lag corresponds to a change of nearly $\frac{1}{1000}$ of an inch of tape, and at 10,000 cycles per inch this corresponds to a phase change of over 3000 degrees. The frequency at which the variations of this character occur is usually that of the rotation of the pay-out reel, although there may be superimposed upon this frequency a second due to the rotation of the take-up reel, usually of considerably less magnitude. The resulting angular modulation due to each of the individual causes is approximately sinusoidal and the average frequency may be of the order of 30 cycles per second.

Various methods have been used to compensate for and minimize the phase modulation resulting from the factors discussed above. Considered broadly the most useful of these methods involve the use of a feedback system which will vary the effective torque of the motor, as applied to the recording medium, in a direction such as to oppose the variation in angular velocity due to the load applied by the tape. These methods may be divided into two categories: first, varying the power supplied to the motor itself, and second, applying a braking torque, independent of that due to the recording medium, and varying the braking torque in the opposite sense to the variations of tape load. Usually the error signal is derived by developing a pilot frequency that is directly proportional to the tape speed and comparing this frequency with a standard-frequency oscillator in some form of discriminator.

Either variant of this broad general method of compensation results in some residual error, as is the case with all feedback systems. The variations in load on the drive motor are primarily inertial; the speed variations lag the forces producing them by 90 degrees. In order to produce the desired compensation there must be a very large degree of amplification in the feedback loop used, because the response is inherently slow due to the lag mentioned and therefore, to make the arrangement effective, very slight deviations in speed must result in large corrective forces. Furthermore, variations of the type mentioned occur in both recording and reproduction. Ordinarily no attempt has been made to correct for variations in tape speed during the recording process, with a result that the feedback system used in reproduction must correct not only for actual variations in load on the motor but also for variations in frequency due to speed changes during recording. Therefore the probable errors to be corrected are about 40 percent greater than those that would be due to variations in load in the reproducing process alone.

The objects of the present invention all have to do with minimizing the residual errors that result from the use of the conventional systems such as have been described above. Among the specific objects of this invention are to provide a quick-acting means of compensating for variations in the load imposed upon the drive mechanism for a recording medium and one which will, in effect, anticipate the resulting changes in the speed of the medium; to provide a mechanism for the purpose described which is highly efficient in its use of power and to provide a device which will compensate for such changes in either recording, reproduction, or both. Further objects are to provide an arrangement wherein the starting operation is simple and the corrective action does not come into play until the medium has reached substantially its desired speed; to provide a ready means for generating or developing the pilot frequency as used in the recording process, and to provide a simple transfer means whereby the same apparatus can be used for both recording and reproduction. Other objects and advantages of the present invention will become apparent in the course of a detailed description of a preferred form of the apparatus which will appear later in this specification.

In accordance with this invention means are provided for developing an electrical oscillation whose frequency is directly proportional to the speed of the medium. Because, as has been pointed out above, no measurable slip occurs between the medium and the drive mechanism in a properly designed apparatus, for recording purposes this oscillation may be developed by a generator mounted on the shaft of the nominally constant speed drive motor, while for reproduction purposes it will normally be derived from a pilot track recorded on the medium itself. From whichever source derived, this frequency is discriminated with respect to its nominal or average value, the discriminator output being used to vary the torque of the drive motor, as in the case of the conventional compensating systems above briefly described, to hold the average value of its speed constant. In addition, however, the drive motor is provided with a brake adapted to apply to the motor a retarding torque variable in accordance with the magnitude of an electric current. A source of oscillation of constant frequency equal to the average desired value of the pilot frequency is provided (it may be the same as that used to control the motor torque) and its output is compared in a phase discriminator with the pilot frequency, to develop an error signal whose sign and magnitude depend, respectively, on the direction and magnitude of the relative phase deviation between the pilot and the constant-frequency sources. This error frequency signal is amplified and supplied to a differentiating circuit whose output varies as the first derivative of the error signal and therefore leads the error signal by 90 electrical degrees, if the error signal be considered as the sine wave which it approximates. The first derivative signal is applied to the braking means, which is biased to provide a small average retarding torque on the motor in addition to the load imposed by the recording medium.

This arrangement leads to a number of beneficial results. In the application of the pilot frequency to vary the motor torque highly efficient magnetic amplifiers can be used. Much more important, however, is the fact that the braking torque that need be applied to correct the residual errors is relatively very small; because of its anticipatory action it corrects for the inertial lag in the variations of angular momentum and reduces the residual errors by as much as an order of magnitude. In addition, since the invention is applied in both recording and reproduction, it substantially reduces the cumulative factor in the remaining residual errors and thus renders possible recording and reproducing techniques that would not otherwise be feasible.

Figure 2:
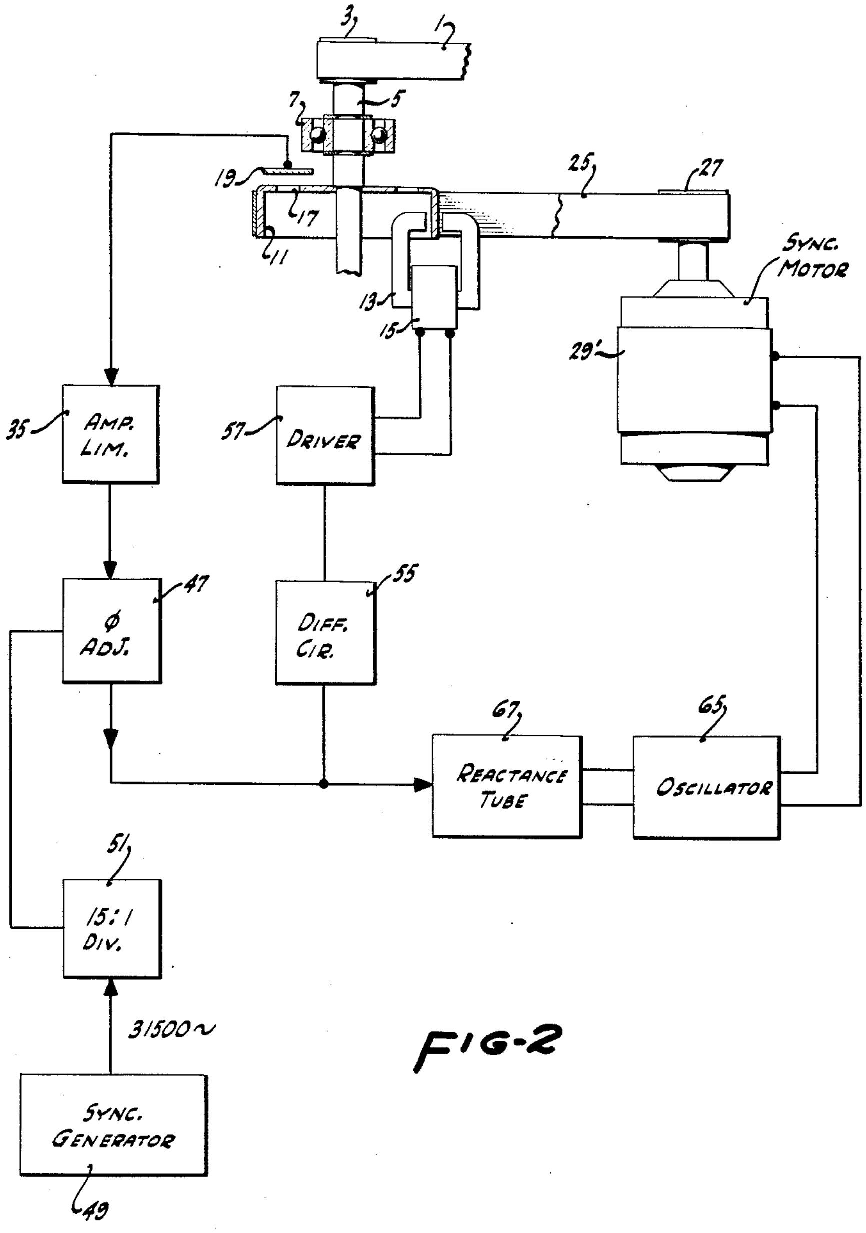

The detailed descriptions of certain preferred embodiments of the invention which follow are illustrated by the accompanying drawings wherein:

FIGURE 1 is a diagrammatic showing of the apparatus employed in one embodiment of the invention, the mechanical features being shown schematically and the electrical elements largely in block form; and FIGURE 2 is a more highly simplified drawing illustrating a different type of control of average motor speed.

FIGURE 1 shows in simplified form a capstan drive for a magnetic recording tape 1. The tape is looped around a drive capstan 3 that is ground accurately concentric with its shaft 5, the latter being supported by a bearing 7. The tape is fed from a pay-off reel to a take-up reel, preferably by some form of tight-loop mechanism which, since it may be entirely conventional, is not shown. The capstan drives a tape past and in contact with a transducer head assembly 9. In a system for recording and reproducing television signals, such as is illustrated here, the assembly 9 will include several transducer heads, each capable of recording signals on or picking signals up from a separate record track; for example, in equipment for recording and reproducing color television signals there may be separate transducer heads for each of the red, green, and blue channels, one for recording the "mixed highs," one for the accompanying sound, and possibly an additional synchronizing or pilot track, although the pilot signal may be superimposed upon the sound. Since, however, only the pilot transducer head is directly involved in the operation of the present invention, it will be this one that is referred to hereinafter as "the transducer head 9."

A dynamic brake-cup or drum 11 is mounted on the opposite end of the shaft 5 from the capstan 3. The depending flange of the brake-cup passes between the pole-pieces 13 of an electromagnet, the exciting coil for which is designated by the reference character 15. The shaft 5 also carries a tachometer, which, in this case, is combined with the brake-cup. The radial surface of the cup is pierced by a plurality of equally spaced holes 17 and a condenser plate 19 is so mounted that the holes pass beneath it as the capstan and its shaft rotate. In this case the number of holes is so selected that when the capstan is rotating at the proper rate to progress the tape at its desired speed, the rate of passage of the holes past the condenser plate is 2100 per second, this frequency being convenient for reasons that will later become apparent. The plate 19 is charged electrically from a suitable source 21 through a high value resistor 23, and therefore as the capstan rotates, the variation in effective capacity between the plate and the cup develops a frequency of 2100 cycles per second when the capstan is rotating at the proper speed; any deviation in speed of the capstan will, however, be reflected in variations in frequency in the voltage developed across the resistor 23. Because of the control exercised by the invention over the capstan speed, however, these changes are so small that they appear only as slight deviations in phase with respect to the constant frequency of 2100 cycles per second.

The cup 11 also serves as a pulley through which the capstan is driven by a belt 25. The belt, in turn, is driven by a pulley 27 mounted on a shaft of an induction motor 29. Preferably the belt 25 has appreciable elastic stretch; i.e., it has appreciable compliance so that it serves to isolate the capstan, to some extent at least, from the inertia of the motor. Being an induction motor, the motor 29 will approach, but not attain, synchronous speed but will rotate at a somewhat less than synchronous rate with a slip depending upon the load imposed thereon. For a given load the amount of slip will depend upon the voltage supplied to the motor. The power of the motor and the ratio of the sizes of the pulley 27 and cup 11 are so selected that when the motor is receiving its maximum available voltage the rotational speed of the capstan is slightly higher than required to drive the tape at its selected speed, even when subjected to maximum load.

The motor is driven from any conventional power source, such as a commercial power supply, through a magnetic amplifier 31. The rotational speed or angular velocity of the capstan can therefore be controlled by a D.C. error voltage applied to the magnetic amplifier, thus varying the slip as has just been described.

As discussed earlier in this specification, the undesired variations in capstan speed usually arise primarily from variations in load imposed upon it by the tape and its pay-out and take-up mechanisms, although they could also occur because of variations in the power supply to the motor. To compensate for these variations, from whatever source, the pilot or tachometer frequency is used to provide the controlling error voltage and this is here done through two different feedback loops. The small tachometer voltage developed across the condenser plate 19 and ground is used only in the recording process, and in this phase of the operation switch 33 is thrown to the position shown, connecting the tachometer to a high gain amplifier and limiter 35, which develops a frequency directly proportional to the capstan speed and at a substantially constant voltage. This voltage is fed through lead 37 to some form of frequency discriminator 39. Several types of discriminators are availabe for use here, but a convenient form is a low pass filter with a sharp cut-off in the neighborhood of 2100 cycles, feeding a detector 41 and thence, through a D.C. amplifier 43, supplying a control voltage to the magnetic amplifier 31. Detector 41 is so poled that large output from the detector 41 increases the power supplied by the amplifier 31 to the motor 29, the normal bias on the amplifier being such that it has sufficient initial torque to start the motor and give an output from the tachometer and supply an initial error voltage which further increases the motor torque and brings it rapidly up to speed. As synchronism is approached the output from detector 41 becomes minimal and the second feedback loop takes over control. If the time constant of the condenser 19 and resistor 23 is long the output voltage of the tachometer is nearly independent of frequency. This is one reason that the electric-field tachometer is employed; a magnetic field frequency-generator could be substituted, however.

In the second feedback loop the output from amplifier 35 is fed through a lead 45, branching off from lead 37, to a phase detector 47, which compares the tachometer frequency with a frequency of the desired 2100 cycle value from a constant frequency source. This could be an independent, crystal-controlled or otherwise stabilized oscillator. In the recording of television signals, however, there is usually available the sync generator controlling the cameras originating the picture to be recorded, and from such a generator there is available the 31,500 cycle, double line-frequency used for generating the equalizing pulses that are transmitted during the vertical flyback period between successive fields of the picture. This frequency forms a convenient source of comparison with the tachometer frequency. The 31,500 cycle frequency from the sync generator 49 is therefore shown as feeding a 15:1 frequency divider 51, the output of which goes to the phase discriminator 47 for comparison with the tachometer frequency, the discriminator developing an error signal that varies in magnitude and sign with the discrepancies in phase between the two signals compared.

The resultant signal is applied through a lead 53' to the D.C. amplifier 43, taking over control from the first feedback loop as soon as the motor 29 approaches the desired speed and the tachometer signal approaches synchronism with the reference signal from the sync generator 49. It will be realized that there is no effective D.C. output from the phase detector or discriminator 47 until approximate synchronism is reached and the use of the first feedback loop therefore facilitates starting, since in this phase of the operation the loop gain is high. After synchronism is reached the effect of the first loop becomes negligible and the second loop assumes a very rigid control over the speed of the motor and, consequently, the recording medium.

The arrangement as thus far described controls the average speed of the medium with very great accuracy, but the average speed is necessarily subject to the deviations which supply the error voltages that serve to hold the tachometer voltage in sync with the comparison voltage. As has been explained, these deviations are due primarily to variations in load that can be traced largely to eccentricities in the pay-out and take-up reels, primarily the former. In spite of means interposed in the tape path to filter out these variations, in the portions of the rotation of the pay-out reel, for example, where the radius of the coil of tape is least, it will pay out more slowly, increasing the tension on the tape and this, in turn, tending to accelerate the reel against its rotational inertia. Where the radius of the tape coil is greatest, the accelerated reel tends to overrun the tape, reducing the load on the capstan and causing the motor to tend to speed up above its average value. The resultant variations in load on the motor are therefore cyclic and nearly sinusoidal, but because the load imposed on the motor by these variations is largely inertial the variations in speed lag 90 degrees behind the load variations that cause them. Therefore no matter how rigid the control there will remain residual variations in speed that cannot be eliminated by a control system of this type alone.

Accordingly, there is provided a third feedback loop of still different character, which anticipates the speed changes and tends to compensate, not merely the variations in speed but the variations in load which cause them.

The third feedback loop, like the second, is supplied by the phase detector or discriminator 47. A branch lead takes off from the lead 53' and supplies a differentiating circuit 55. This may be merely an inductor bridged across the line, but usually, and generally more economically, comprises a condenser, in series with the line, followed by a resistor bridged across it. The voltage developed across such a circuit is proportional to the first derivative of the input voltage and since the error voltage approaches a sine-wave in form the output of a differentiating circuit is a cosine voltage, leading the voltage from the phase discriminator 47 by 90 electrical degrees, just as the load on the motor leads its variation in speed by 90 degrees, changing in sign in anticipation of the changes in sign of the phase-discriminator output. The derivative or derived voltage is applied to a driver 57. This may be a vacuum tube, triode, tetrode, or pentode, or a transistor. If a vacuum tube, its plate circuit is connected in series with the winding 15 on the brake magnet. The grid of the tube is biased so that in the absence of any signals from the differentiating circuit a small braking torque is applied to the capstan owing to the development of eddy currents in the flange of the cup 11. The derived signal is applied to the grid of the tube at such polarity that there is a tendency with increased speed to increase the coil current and vice versa. The preferred form of driver is a pentode, having high mutual conductance, so that effectively a very considerable loop gain is added by the driver itself.

The brake here shown is, of course, of the dynamic type and the retarding torque exercised by it is a function of the product of the rotational speed of the cup 11 and the intensity of the magnetic flux through its rim. During the starting period it therefore exercises very little restraining torque, but when the capstan is up to speed the variations in angular velocity of the cup are so small that the torque may be considered as directly proportional to the flux developed by the electromagnet.

As in any control system depending on feedback, there will, of course, remain residual errors and these errors are inversely proportional to the loop gain. Theoretically, the residual error can be reduced to as small value as may be desired in any such system, but in practice there are limits imposed by practical consideration. In actual test it has been shown that the apparatus described reduces the residual errors by as much as an order of magnitude over the best consistently attainable by the use of either a motor control or a brake control alone. Because of the anticipatory feature, the maximum additional load on the motor imposed by the brake can be made a very small percentage of the total load, leading to a very efficient use of the motor, the magnetic amplifier is itself a very efficient device.

For the reproduction of a recording made with the tape speed controlled as has been described, a pilot signal is recorded on the tape at the same 2100 cycle frequency developed by the tachometer. The pilot signal could be derived from the tachometer signal itself, but preferably, the standard comparison frequency signal from the frequency divider 51 is used. In recording, with the switch 33′ in the position shown in the drawing, the comparison-frequency signal is fed through lead 59 to the transducer head 9, thus imposing a record of the 2100 cycle frequency on the tape. In playback, switches 33 and 33′ are thrown to the contacts shown open in the drawing, so that instead of being supplied from the tachometer 19 amplifier 35 is supplied by the pilot frequency derived from the tape.

In playing back recorded television signals it is usual to employ a sync generator at the station transmitting the recorded signals to generate the blanking and synchronizing pulses required for a complete picture transmission. In the playback operation the sync generator 49 may, therefore, be the same one used in recording, or it may be one located at a distant station to which the record has been sent. The operation of the apparatus on playback is identical with that in recording, with the single exception that the comparison frequency is derived from the tape instead of from the tachometer. Using the constant standard frequency from the sync generator to supply the pilot frequency in recording, on playback the apparatus will tend to correct the residual errors in recording speed. These are so small it is quite feasible to derive the pilot from the tachometer itself, but using the separate, constant-frequency source reduces the probable cumulative residual error by a factor of $$\frac{1}{\sqrt{2}}$$

which is, of course, desirable, however, small the residual error may be.

FIG. 2 shows, in even more highly simplified form than FIG. 1, the application of the invention to a recorder-reproducer using a different system for maintaining the average speed of the tape constant. Many elements of the system are identical with those illustrated and described in FIG. 1, and these elements are designated by the same reference characters as are used to indicate like parts in FIG. 1. In the arrangement of FIG. 2, however, a synchronous motor 29′ is used to drive the capstan through the belt 25 as before. The sync motor, however, is supplied by a power oscillator 65, the frequency of which is controlled by a reactance tube 67. As in the case of FIG. 1, the signal from the tachometer plate 19 is amplified and limited in the apparatus included in the block 35 and supplied to the phase discriminator 47, where it is compared with the signal from the frequency divider 51, supplied in turn from the sync generator 49. The error signal from the phase discriminator controls the reactance tube 67, this tube being set so that in the absence of an error signal from the discriminator the oscillator will drive the sync motor at slightly over the required normal speed. As has already been described, no effective control signal is developed by the phase discriminator until the capstan speed is very close to that desired, whereupon the phase detector will assume control as the motor speed approaches and tends to pass through the required value. The operation of the brake in response to the derived signal is precisely the same as before. The playback arrangement is not shown in this figure since its operation will be understood from the description already given in connection with FIG. 1.

Various other modifications are, of course, possible. For example, the capstan can be mounted directly upon the shaft of a synchronous motor which, for recording, is supplied by a crystal-controlled oscillator or other constant frequency source, while for playback the control is transferred to the reactance tube in the same manner as where a belt drive is used. The advantage of the belt drive is that the compliance of the belt tends to filter out the effects due to the inertia of the rotor of the drive motor and thus decreases the duty imposed upon the brake. These modified forms of the invention are shown and described to bring out clearly the fact that while the invention does require means of maintaining the average tape speed constant, the particular form taken by this primary control is not, per se, important, and although the form shown in FIG. 1 is desirable because even though it may appear more complex than that illustrated in FIG. 2 actually it is less expensive and more efficient in its use of power.

It should also be apparent that a friction brake could be used in place of the dynamic brake illustrated in both figures. Again it is factors of initial economy and overall reliability and freedom from maintenance troubles that dictate the use of the dynamic brake.

The particular forms of apparatus illustrated are therefore not intended to be construed as limitations upon the scope of the invention, all intended limitations being specifically expressed in the claims which follow.

What is claimed is:

1. In apparatus for progressing a recording medium past a transducer head, means for maintaining the velocity of said medium at a constant selected value comprising the elements designated as elements (*a*) to (*j*) inclusive and defined as follows:

Element (*a*): a rotating element for engaging said medium and driving it at a speed directly proportional to the angular velocity of said element;

Element (*b*): a motor for driving element (*a*) at an average angular velocity equal to that required to drive said medium at said selected speed;

Element (*c*): means for applying to element (*a*) a braking force in response to the magnitude of an electric current;

Element (*d*): means for developing an electrical oscillation varying in frequency in direct proportion to the instantaneous angular velocity of element (*a*);

Element (*e*): a frequency discriminator connected to element (*d*);

Element (*f*): means for applying the output of element (*e*) to element (*b*) to vary the torque thereof so as to increase said torque when the speed of said medium is less than said selected value and decrease said torque when said speed is greater than said selected value;

Element (*g*): a source of oscillations of a constant frequency equal to that of the oscillation produced by element (*d*) when the speed of said medium is equal to said selected value;

Element (*h*): a phase discriminator connected to compare the phase of the oscillations produced by elements (*d*) and (*g*) respectively and develop therefrom an error signal varying in direction and magnitude with the direction and magnitude of the departure of said oscillations from a selected phase relationship;

Element (*i*): a differentiating circuit connected for supply by said error signal; and Element (*j*): connections from element (*i*) to element (*c*) for varying the braking force applied by element (*c*).

2. In apparatus for progressing a recording medium past a transducer head, means for maintaining the velocity of said medium at a constant selected value comprising the elements designated as elements (*a*) to (*i*) inclusive and defined as follows:

Element (*a*): a rotating element adapted to drive said medium;

Element (*b*): a motor for driving element (*a*) at a constant average speed;

Element (*c*): means for developing an oscillation of a frequency directly proportional to the instantaneous speed of said medium;

Element (*d*): means responsive to the oscillation developed by element (*c*) for increasing the torque of element (*b*) when the instant speed of said medium drops below said selected value and increasing said torque when the speed of said motor rises above said selected value;

Element (*e*): means for applying a braking force, variable in response to the value of an electric current, to element (*a*);

Element (*f*): a source of electrical oscillations of constant frequency equal to the average frequency developed by element (*c*);

Element (*g*): a discriminator supplied by elements (*c*) and (*f*) for developing an output error voltage varying with variation in phase between the oscillations developed thereby;

Element (*h*): a differentiating circuit supplied by said error voltage; and

Element (*i*): connections for applying voltage developed across element (*h*) to vary the braking force applied by element (*e*).

3. In apparatus for progressing a recording medium past a transducer head, means for maintaining the velocity of said medium at a constant selected value comprising the elements designated as elements (*a*) to (*i*) inclusive and defined as follows:

Element (*a*): a rotating element for engaging said medium and driving it at a speed directly proportional to the angular velocity of said element;

Element (*b*): a motor for driving element (*a*) at an average angular velocity equal to that required to drive said medium at said selected speed;

Element (*c*): means for applying to element (*a*) a braking force in response to the magnitude of an electric current;

Element (*d*): means for developing an electrical oscillation varying in frequency in direct proportion to the instantaneous angular velocity of element (*a*);

Element (*e*): a source of oscillation of constant frequency equal to that of the oscillation produced by element (*d*) when the speed of said medium is equal to said selected values;

Element (*f*): a phase discriminator connected to compare phase of the oscillations produced by elements (*d*) and (*e*) respectively and develop therefrom an error signal varying in direction and magnitude with the direction and magnitude of the departure of said oscillations from a selected phase relationship;

Element (*g*): means for applying the output of element (*f*) to element (*b*) to vary the torque thereof to increase said torque when the speed of said medium is less than said selected value and decrease said torque when said speed is greater than said selected value;

Element (*h*): a differentiating circuit connected for supply by said error signal; and Element (*i*): connections from element (*h*) to element (*c*) for varying the braking force supplied by element (*c*).

4. The combination as defined in claim 3, including in addition, a frequency discriminator connected to element (*d*) of said combination and means for applying the output of said frequency discriminator to increase the torque of element (*b*) thereof when the speed of said motor is less than said selected value and decrease said torque when said speed is greater than said selected value.

5. In apparatus for regulating the rotational speed of an output shaft driven by a motor, means coupled to the output shaft for developing a signal having a frequency proportional to the instantaneous angular velocity of the output shaft; a first feedback loop having means responsive to the signals from the signal developing means and effective at signal frequencies below a particular frequency for varying the torque applied by the motor to the output shaft; a reference frequency source; a second feedback loop including means responsive to the signals from the reference frequency source and from the signal developing means for comparing the phase of the signals from said developing means and from said source to develop an error signal having characteristics dependent upon this phase relationship; adjustable means coupled to the output shaft for applying a braking torque to the output shaft; and a differentiating circuit coupled to said comparing means and said torque applying means for supplying a signal to said torque applying means for varying the torque applied to the output shaft in accordance with anticipated changes of said error signal.

6. In apparatus for regulating at a particular value the speed of movement of an output member, a motor operatively coupled to the output member for driving the output member at a variable speed, means responsive to the operation of the motor for producing an error signal having phase characteristics dependent upon deviations in the speed of the motor from the particular value, differentiating means responsive to the error signal for shifting the phase of the error signal in a leading direction through a particular angle to provide an anticipation in deviations in the speed of the motor from the particular value, and means responsive to the phase shifted error signal for adjusting the speed of the motor in accordance with the characteristics of the phase shifted error signal to maintain the speed of the motor at the particular value.

7. In apparatus for regulating at a particular value the speed of movement of an output member driven by an adjustable motor, means responsive to the speed of the motor for producing an error signal having phase characteristics dependent upon the variations in the speed of the motor from the particular value, means responsive to the error signal for shifting the phase of the error signal in accordance with the phase of the error signal to provide an anticipation in changes in the speed of the motor from the particular value, and means responsive to the phase shifted error signal for adjusting the speed of the motor in accordance with the characteristics of such signal to maintain the speed of the motor at the particular value.

8. In apparatus for regulating at a particular value the speed of movement of an output member, a motor operatively coupled to the output member for driving the output member at a variable speed, means responsive to the operation of the motor for producing an error signal having phase characteristics dependent upon the variations in the speed of the motor from the particular value, means responsive to the error signal for shifting the phase of the error signal in a leading direction through a particular angle to provide an anticipation in the variations in the speed of the motor from the particular angle, first means responsive to the error signal for adjusting the speed of the motor in accordance with the characteristics of the error signal, and second means responsive to the phase shifted error signal for adjusting the speed of the motor in accordance with the characteristics of the phase shifted error signal.

9. The apparatus set forth in claim 8 in which the phase shifting means includes differentiating means responsive to the error signal for shifting the phase of the error signal in a leading direction through an angle of substantially 90°.

10. In apparatus for regulating the speed of movement of an output member driven by an adjustable motor; means coupled to the output member for developing a signal having a frequency proportional to the instantaneous velocity of the output member; a first feedback loop having means effective at signals from said signal developing means in a particular range of frequencies for adjusting said motor to the regulated speed controlling the driving force applied by said motor to said output member, said adjusting means including a low pass filter responsive to the signals from said signal developing means for attenuating signals having frequencies corresponding to movements of the output member in excess of the regulated speed so that said motor is not adjusted by said first feedback loop for speeds in excess of the regulated speed; a reference frequency source; and a second feedback loop having means jointly controlled by said reference frequency source and by said signal developing means for producing an error signal having phase characteristics dependent upon the relative phase characteristics of the signals from the reference frequency source and the signal developing means and for shifting the phase of the error signal in a leading direction for applying a braking force to the output member in accordance with the characteristics of the phase shifted error signal to maintain the movement of the member at the regulated speed.

11. In apparatus for regulating the rotational speed of an output shaft driven by an adjustable motor; means coupled to the output shaft for developing a signal having a frequency proportional to the angular velocity of the output shaft; frequency discriminating means controlled by said developing means for adjusting said motor in accordance with the frequency of the developed signal to vary the torque delivered by the motor; means coupled to the output shaft for applying an adjustable braking torque to the output shaft; discriminating means controlled by the developing means for producing signals representing variations in the phases of the signals from the developing means; and differentiating means controlled by the discriminating means for varying the phase of the signals from the discriminating means to provide an anticipation in the variation in such phase; and means coupled to the brake means for introducing the signals from the differentiating means to the braking means to anticipate the changes in the phases of the signals from the discriminating means.

12. In apparatus for regulating the speed of an output member driven by an adjustable motor; means for developing a signal having a frequency related to the instantaneous angular velocity of the output member, a reference frequency source, a phase discriminator coupled to the reference frequency source and to the signal developing means for comparing the phases of the signals from said signal developing means and from said source to develop an error signal having phase characteristics varying in accordance with the departure of said signals from the signal developing means from a particular phase relationship relative to the signals from the reference frequency source, means responsive to the error signal from the phase discriminator for shifting the phase characteristics of the error signal in accordance with the phase of the error signal at each instant, means coupled to the output member for applying an adjustable braking force to the output member, means responsive to the error signal from the comparing means and coupled to the adjustable motor for adjusting the motor to vary the driving force applied by the motor to the output member in accordance with the characteristics of the error signal, and means responsive to the phase shifted error signal and coupled to the braking means for varying the braking force applied by the braking means to the output member in accordance with the characteristics of said phase shifted error signal.

13. In apparatus for regulating the rotational speed of an output shaft driven by an adjustable motor, means coupled to the output shaft for developing a signal having a frequency proportional to the instantaneous angular velocity of the output shaft, a reference frequency source, a phase discriminator responsive to the signals from the signal developing means and from the reference frequency source for comparing the phase of the signals from said signal developing means and from said source to develop an error signal having a phase variable in accordance with variations of said signals from the signal developing means from a particular phase relationship relative to the signals from the reference frequency source, means coupled to the discriminator for shifting the phase of the error signal in accordance with the phase of such signal to represent anticipated changes in the characteristics of the error signals, means coupled to the output shaft for applying an adjustable braking torque to the output shaft, means responsive to the error signal and coupled to the adjustable motor for adjusting the motor to vary the driving force applied by said motor to the shaft in accordance with the characteristics of said error signal, and means responsive to the phase shifted error signal representing the anticipated error and coupled to the adjustable means for varying the operation of said adjustable means in accordance with the anticipated changes represented by said phase shifted error signal.

14. In apparatus for regulating the rotational speed of an output shaft driven by an adjustable motor, means coupled to the output shaft for rotating the output shaft; means coupled to the output shaft and including electrical circuitry for developing a signal having a frequency proportional to the instantaneous angular velocity of the output shaft; a first feedback loop responsive to the frequency of the signals from the signal developing means and having electrical circuitry effective at signal frequencies from said signal developing means below a particular frequency for adjusting the motor to vary the rotational movement imparted by the motor to the output shaft; a reference frequency source; and a second feedback loop responsive to the signals from the signal developing means and from the reference frequency source and including electrical circuitry for comparing the phases of the signals from said developing means and from said source to develop an error signal having a phase dependent upon the results of the comparison, means responsive to the error signal for shifting the phase of the error signal in accordance with the phase of such signal, means coupled to the output shaft for applying an adjustable braking torque to the output shaft, means responsive to the error signal having the adjusted phase and including electrical circuitry coupled to the adjustable braking means for varying the braking torque imparted by the adjustable braking means to the output shaft in accordance with the characteristics of the error signal.

15. In apparatus for regulating the speed of an output member driven by an adjustable motor, means coupled to the output shaft and including electrical circuitry for developing a signal having a frequency proportional to the instantaneous velocity of the output member; means including a first feedback loop responsive to the signals from the developing means and including in the loop electrical circuitry effective at signal frequencies from said signal developing means in a particular range below a predetermined frequency corresponding to the regulated speed of the motor for adjusting the motor to vary the force imparted to the output member by the motor; a reference frequency source; and means including a second feedback loop having electrical circuitry effective in a second particular range of frequencies including said predetermined frequency and responsive to the signals from the developing means and from the reference source for producing an error signal having a phase dependent upon any difference in characteristics between the signals from the source and from the developing means and for shifting the phase of such error signal in accordance with the phase characteristics of the error signal and for applying to the output member a braking force dependent upon the characteristics of the phase shifted error signal to maintain the speed of the output member at the regulated value.

16. In apparatus for regulating the instantaneous speed of an output shaft driven by a motor, including, means coupled to the shaft and including electrical circuitry for developing a signal having a frequency proportional to the angular velocity of said shaft; a source of reference frequency; means including electrical circuitry responsive to the signals from the signal developing means and from the reference frequency source for producing an error signal having phase characteristics dependent upon the phase difference between the signals; means including electrical circuitry responsive to the error signal for adjusting the motor to vary the driving force imparted by the motor to the shaft in accordance with the characteristics of said error signal; means including electrical circuitry responsive to the error signal to shift the phase of said error signal in a leading direction through a particular angle; means coupled to the output shaft for applying an adjustable braking torque to the output shaft; and means coupled to the output shaft and including electrical circuitry responsive to the phase shifted error signal for varying the force imparted by said adjustable means on the shaft in accordance with the characteristics of said phase shifted error signal.

17. In apparatus for regulating the speed of movement of an output shaft driven by a motor; a brake coupled to said shaft; means coupled to the shaft for developing a signal having a frequency proportional to the angular velocity of said shaft; a first feedback loop responsive to the signals from said developing means in a first particular range of frequencies for controlling the magnitude of the operating current supplied to said motor; a reference frequency source; and a second feedback loop including means effective at signals from said developing means in a range including said predetermined frequency for comparing the phase of said signal from said developing means with the phase of the signal from said source to produce a first error signal having a phase dependent upon such comparison, means responsive to the phase of the first error signal for varying the phase of the first error signal in accordance with the phase of the first error signal to produce a second error signal, and means responsive to said second error signal for controlling the operation of said brake.

18. In apparatus for regulating the rotational speed of an output shaft driven by an adjustable motor, means coupled to the output shaft for developing a signal having a frequency proportional to the instantaneous angular velocity of the output shaft; a first feedback loop having means responsive to the frequencies of the signals from said signal developing means in a first particular range of frequencies considerably different from that corresponding to the regulated speed of the shaft for adjusting the motor to vary the force imparted by the motor to the shaft in accordance with the frequencies of the signals; a reference frequency source; and a second feedback loop responsive to the signals from the reference frequency source and from the signal developing means and including means for providing an error signal having phase characteristics proportional to the difference in phases between the signals supplied from said source and from said signal developing means for a second particular range of frequencies near that corresponding to the regulated speed of the shaft and for shifting the phase of the error signal in a leading direction to provide an anticipation in errors in the rotational movement of the output shaft, the second feedback loop being coupled to the first feedback loop for adjusting the motor to vary the force imparted by the motor to the shaft in accordance with the characteristics of the phase shifted error signal.

References Cited in the file of this patent

UNITED STATES PATENTS

| | | |
|---|---|---|
| 2,334,510 | Roberts | Nov. 16, 1943 |
| 2,708,668 | Farr et al. | Feb. 5, 1957 |
| 2,715,202 | Turner et al. | Aug. 9, 1957 |
| 2,782,335 | Wilcox | Feb. 19, 1957 |
| 2,803,793 | Wible | Aug. 20, 1957 |
| 2,866,143 | Maxwell | Dec. 23, 1958 |